United States Patent
Schenk et al.

(10) Patent No.: US 6,296,819 B1
(45) Date of Patent: Oct. 2, 2001

(54) PROCESS FOR THE MANUFACTURE OF COARSE ALUMINIUM HYDROXIDE

(75) Inventors: Hans Jürg Schenk, Aarau; Hans-Peter Breu, Nussbaumen, both of (CH); Arvind Bhasin, Kenmore (AU)

(73) Assignee: Alusuisse Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/421,538

(22) Filed: Oct. 20, 1999

(30) Foreign Application Priority Data

Oct. 28, 1998 (EP) .................................................. 98811081

(51) Int. Cl.$^7$ ....................................................... C01F 7/02
(52) U.S. Cl. ............................ 423/121; 423/127; 423/629
(58) Field of Search .................................. 423/121, 127, 423/629

(56) References Cited

U.S. PATENT DOCUMENTS

| 4,311,486 | 1/1982 | Yamada et al. |
| 4,364,919 | * 12/1982 | Yamada et al. ...................... 423/121 |

FOREIGN PATENT DOCUMENTS

| 1193926 | 6/1965 | (DE) . |
| 3206110 | 9/1982 | (DE) . |
| 0344469 | 12/1989 | (EP) . |
| 1391596 | 5/1964 | (FR) . |
| 2034681 | 6/1980 | (GB) . |
| WO 91/12205 | 8/1981 | (WO) . |
| WO 93/11072 | 6/1993 | (WO) . |

* cited by examiner

*Primary Examiner*—Steven Bos
(74) *Attorney, Agent, or Firm*—Fisher, Christen & Sabol

(57) ABSTRACT

A process for the manufacture of coarse aluminum hydroxide via the Bayer Process. The process involves the decomposition of a supersaturated alkaline aluminate liquor in a two stage precipitation process having an agglomeration stage and a growth stage. The agglomeration stage takes place in agglomeration tanks, where the liquor is seeded with fine aluminum hydroxide to induce precipitation and formation of a suspension, followed by a growth stage, where the suspension is seeded with a coarse aluminium hydroxide. Typically, the feed of the supersaturated alkaline aluminate liquor is split over a first agglomeration tank at a higher liquor temperature of 70° to 100° C. and a second agglomeration tank or one or more of a series of second agglomeration tanks at a lower liquor temperature of 50° to 80° C.

26 Claims, 2 Drawing Sheets

PROCESS FOR THE MANUFACTURE OF COARSE ALUMINIUM HYDROXIDE

Figure 1:
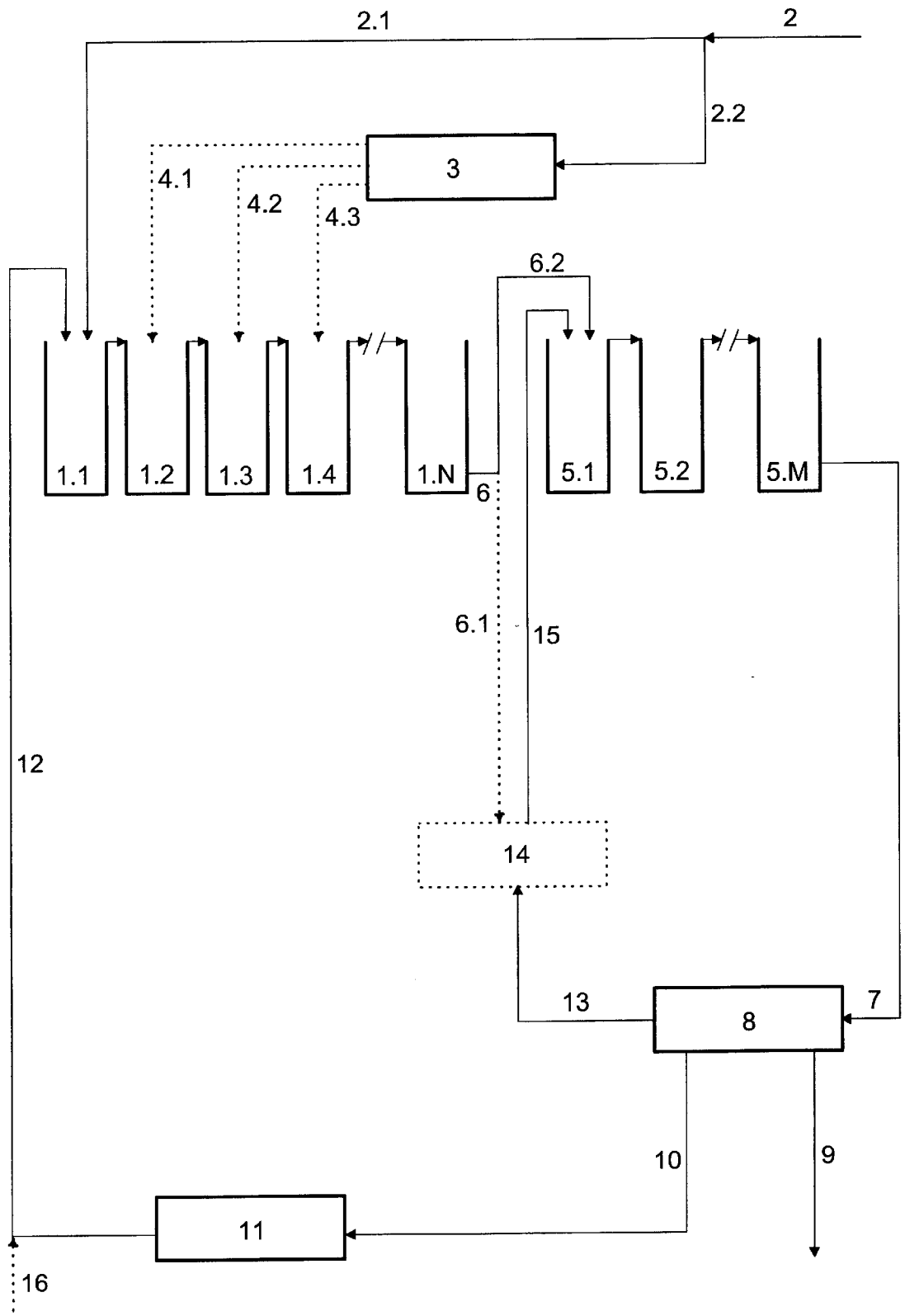

The invention concerns a process for manufacturing coarse aluminium hydroxide by decomposition of a supersaturated alkaline aluminate liquor in a two stage precipitation process having an agglomeration stage in agglomeration tanks connected in series, where the liquor is seeded with fine aluminium hydroxide to induce precipitation and formation of a suspension, followed by a growth stage, where the suspension is seeded with coarse aluminium hydroxide.

The invention relates to the manufacture of aluminium hydroxide $Al(OH)_3$ for the purpose of manufacturing metal grade alumina which meets the requirements of the modern aluminium smelters.

In particular the invention relates to a process for the manufacture of coarse aluminium hydroxide via the Bayer Process in which the alumina values of the alumina containing ore are solubilized at a relatively high temperature in an aqueous liquor of caustic soda and sodium aluminate and in which these alumina values are crystallized later on at a lower temperature in the form of aluminium hydroxide. The aluminium hydroxide, also called product hydrate, is calcined to yield a sandy alumina.

This crystallization procedure, hereinafter referred to as precipitation, is enhanced by the seeding of the supersaturated sodium aluminate liquor (also called the pregnant liquor) with aluminium hydroxide (also simply called "hydroxide" or even "hydrate").

The invention concerns more particularly a mode of application of the Bayer process in which the precipitation is achieved in two stages, namely an agglomeration stage followed by a growth stage.

In the U.S. Pat. No. 4,234,559 an agglomeration stage is characterized by the seeding of the pregnant liquor with a controlled amount of relatively fine hydrate referred to as the fine seed allowing to achieve the control of the product hydrate granulometry. A following growth stage is characterized by the seeding of the suspension leaving the agglomeration stage with a high amount of coarser hydrate referred to as the coarse seed allowing to achieve a high precipitation yield. In order to make it operational, this precipitation process in two stages must be complemented with the classification of the separated hydrate into fine seed, coarse seed and product hydrate, and with the separation of the exhausted liquor (also called the spent liquor) from the hydrate.

This two-stage precipitation process allows the production of a product hydrate with a particle size distribution showing a proportion of particles with the diameter smaller than 45 micrometers not exceeding 15% by weight and which may be as low as 3% by weight.

This two-stage precipitation process also allows to achieve a high liquor productivity i.e. a high yield of precipitation of aluminium hydroxide per unit volume of pregnant liquor. Thus, liquor productivities of typically 70 to 85 g $Al_2O_3$ per liter of liquor can be commonly achieved under industrial operating conditions. A yield of 91.7 g $Al_2O_3$ was achieved in a test procedure.

As far as the chemical composition of the metallurgical alumina is concerned, the modern smelters are favoring nowadays an alumina with a relatively low soda content.

In the AIME-Report of 1988, pages 125 to 128, "Operation of the Alusuisse precipitation Process at Gove" by S. G. Howard, a precipitation process layout had been presented, showing cooled pregnant liquor seeded in two phases. The pregnant liquor flow is split between the first two precipitation tanks of the agglomeration phase.

It is an objective of the instant invention to reduce the occlusion of soda in the aluminium hydroxide (also called "product hydrate") produced in a two-stage precipitation process while maintaining a high liquor productivity and a good control of the granulometry and strength of the product.

Under occlusion of soda is meant the incorporation in the aluminium hydroxide crystal lattice of soda values which cannot be removed by the thorough washing with water of the product hydrate. For example an occluded soda content of the product hydrate could be as high as 0.4% or even 0.45% calculated in weight percent $Na_2O$ on an $Al_2O_3$ basis, depending on the liquor purity. With the process according to the instant invention it is possible to reduce the occluded soda content for example by 0.05% to 0.15% $Na_2O$, thus allowing to achieve an occluded soda content of for example below 0.35% or even of 0.25% and below.

According to the present invention, the feed of the supersaturated alkaline aluminate liquor to the agglomeration stage is split into a first substream and said first substream is fed to a first agglomeration tank or to the first and more of a series of first agglomeration tanks at a higher liquor temperature of 70 to 100° C. and a second substream and said second substream is fed to a second agglomeration tank or to two or more of second agglomeration tanks at a lower liquor temperature of 50 to 80° C., at the end of precipitation yielding a strong coarse product hydrate, giving after calcination a sandy alumina with low occluded soda content, compatible with a high liquor productivity.

In a preferred embodiment of the instant invention the supersaturated alkaline aluminate liquor is split into a first substream representing 30 to 60% of the total supersaturated alkaline aluminate liquor stream. Said first substream is fed to the first agglomeration tank or a series of first agglomeration tanks of the agglomeration stage. The first substream of the supersaturated alkaline aluminate liquor is fed at a relatively high temperature of for example 70 to 90° C. and preferably 80 to 90° C. One first agglomeration tank can be present or a series of two or more first agglomeration tanks can be present. The first substream of the supersaturated alkaline aluminate liquor can be fed to the one first agglomeration tank or can be fed and distributed to each of two, preferably two, or more of the series of first agglomeration tanks. If a series of two of first agglomeration tanks are present, the first substream of the supersaturated alkaline aluminate liquor can be distributed to the first and the second agglomeration tank of the series of first agglomeration tanks. The fine aluminium hydroxide, also called the fine seed, can be fed into the one first agglomeration tank or can be fed in the first agglomeration tank of the series of two or more first agglomeration tanks or can be fed and distributed over the first two agglomeration tanks of the series of two or more first agglomeration tanks. The supersaturated alkaline aluminate liquor and the fine seed form a suspension with a solids content in the one first agglomeration tank or in the series of first agglomeration tanks of 100 to 500 g/l, preferably 150 to 450 g/l and especially 300 to 400 g/l.

Connected in series with the first agglomeration tank or the series of first agglomeration tanks are the second agglomeration tank or a series of second agglomeration tanks.

The balance of 70 to 40% of the supersaturated alkaline aluminate liquor forms the second substream. Said second substream is typically fed to the one second agglomeration tank or fed to one of the series of second agglomeration tanks or fed and distributed to two or more or all of the series of second agglomeration tanks. The second substream of the supersaturated alkaline aluminate liquor is preferably fed to the second agglomeration tank or to the series of second agglomeration tanks at a relatively low temperature of preferably 60 to 80° C. and especially 60 to 70° C.

For example the second substream of liquor representing 70 to 40% of the total supersaturated alkaline aluminate liquor flow may be sent to the one second agglomeration tank, or to one of two or more of the series of second agglomeration tanks, or to two or more of two or more of the series of second agglomeration tanks. If two or more agglomeration tanks are present in the series of second agglomeration tanks, the second agglomeration tanks are connected in series. The one first agglomeration tank or the last of the series of first agglomeration tanks is connected in series with the one second agglomeration tank or the first tank of the series of second agglomeration tanks.

In another embodiment the second substream of liquor representing 70 to 40% of the total supersaturated alkaline aluminate liquor flow may be sent to and distributed over two of the series of second agglomeration tanks.

In another embodiment the second substream of liquor representing 70 to 40% of the total supersaturated alkaline aluminate liquor flow may be sent to and distributed over three of the series of second agglomeration tanks.

The second substream of the supersaturated alkaline aluminate liquor is typically fed to the second agglomeration tank or the series of second agglomeration tanks at a temperature of for example 5 to 50° C., preferably 15 to 40° C. and especially 20 to 30° C., below the temperature of the first substream.

Preferably the supersaturated alkaline aluminate liquor split over the first substream represents 40 to 60% of the total supersaturated alkaline aluminate liquor stream. Accordingly the second substream represents in the preferred manner the balance of 60 to 40% of the total supersaturated alkaline aluminate liquor stream.

All numbers given in percentage are related to the weight, if not indicated otherwise.

Typically the first substream is fed to the one first agglomeration tank and the second substream is fed to one tank of the series of second agglomeration tanks. Or, in an alternative preferred embodiment, the first substream is fed to the one first agglomeration tank and the second substream is fed to the one second agglomeration tank or to 2, 3 or 4 of the series of second agglomeration tanks of 2 or more, 3 or more or 4 or more of the series of second agglomeration tanks respectively.

As for example the first substream is fed to the one first agglomeration tank and the second substream is fed to the first in series of the second agglomeration tanks. Or, the first substream is fed to the one first agglomeration tanks and the second substream is fed to the first of two or more of the series of second agglomeration tanks. Or, the first substream is fed to the one first agglomeration tank and the second substream is fed to the two of the series of second agglomeration tanks following the one first agglomeration tank. Or, the first substream is fed to the one first agglomeration tank and the second substream is fed to the three of the series of second agglomeration tanks following in series the first agglomeration tank. Or, the first substream is fed to the one first agglomeration tank and the second substream is fed to the second or the third or the second and the third of the series of second agglomeration tanks, arranged in series.

The total residence time for the precipitation in the first agglomeration tank or the series of first agglomeration tanks and the second agglomeration tank or all of the series of second agglomeration tanks in series is typically 3 to 12 hours. The total residence time for the precipitation in the first or first series and in the second or second series of agglomeration tanks is achieved in a first or a series of first and a second or a series of second agglomeration tanks, the number of which being a total of for example 2 to 10 and preferred 2 to 6.

Typically the one first agglomeration tank or the series of first agglomeration tanks and the one second agglomeration tank or the series of second agglomeration tanks are arranged in series. In an alternative embodiment one or more of the tanks of the series of second agglomeration tanks can be substituted by tanks in parallel. In such an arrangement the feed of suspension from the first agglomeration tank or the series of first agglomeration tanks is divided and fed to the second agglomeration tanks in parallel and the second substream is divided and fed to the second agglomeration tanks in parallel as well.

The suspension leaving the agglomeration stage then enters a first growth tank of the growth stage where it meets the coarse seed in an amount allowing to achieve a solids content in the end of precipitation suspension of 300 to 900 g/l and preferably 350 to 550 g/l. The total residence time in the growth stage is normally 20 to 50 hours and is achieved in one or more growth tanks or in one or more series of growth tanks. The total number of growth tanks is 1 to 200 and typically 5 to 30. The temperature profile along the growth tanks of the growth stage can be adjusted by one or several steps of forced cooling as to achieve an end of precipitation temperature of typically 50 to 65° C.

The advantages of the invention in comparison with the previous art are manifold:

The hot supersaturated alkaline aluminate liquor which enters in contact with a high amount of fine seed (in terms of solids content) offers the best conditions (high temperature, low supersaturation) for a lower soda occlusion.

The cooler supersaturated alkaline aluminate liquor which is added further downstream over one or more tanks of the agglomeration stage allows to re-establish the conditions for a good agglomeration of the fine seed and hence for a satisfactory control of the product hydrate granulometry.

The temperature which can be achieved at the beginning of the growth stage by cooling part of the supersaturated alkaline aluminate liquor allows to obtain favorable conditions for a high productivity and this more economically than by cooling the whole precipitation suspension.

The growth precipitation stage having a minor influence on the soda inclusion mechanisms can be run as to maximize the productivity, in particular, a high seed charge can be applied. Furthermore, forced cooling in one or several intermediate steps can also be applied to increase the supersaturation and hence the liquor productivity.

Therefore it can be seen that the method of introducing the liquor to the agglomeration stage of the two-step precipitation process to which the invention applies can actually permit the achieving of a lower soda content in the product hydrate while maintaining the product quality (strong sandy alumina) and high liquor productivity advantages of the two-stage precipitation process as per the prior art.

The particular characteristics of the process which can be designed according to the invention will be better understood by a description of this process with reference to the accompanying diagrams of FIG. 1 to 5 providing a schematic representation by examples of the two-stage seeding precipitation process with liquor flow splitting over the agglomeration stage and the subsequent growth stage.

FIG. 1 provides a full schematic representation of the two-stage seeding precipitation process.

FIGS. 2 to 5 provide schematic representations of alternative arrangements of the tanks for the agglomeration stage.

The arrangements shown in these figures are not limitating, but constitute only a selection among many possible arrangements.

The following descriptions illustrate the main aspects of the process according to the instant invention, however, without limiting the extent of the invention.

In the process depicted under FIG. 1, the agglomeration stage of the precipitation procedure is taking place in the first agglomeration tank 1.1 and the series of second agglomeration tanks 1.2, 1.3, 1.4, . . . , 1.N. The agglomeration stage is fed continuously with the supersaturated alkaline aluminate liquor 2, also called pregnant liquor, and a controlled amount of fine aluminium hydroxide constituting the fine seed stream 12. The amount of fine seed is adjusted taking into account the active specific surface area of the seed and the liquor characteristics so as to allow an efficient control of the granulometry and strength of the final product aluminium hydroxide. The pregnant liquor 2 and the fine seed stream 12 are forming by precipitation of aluminium hydroxide the suspension 6. The pregnant liquor 2 is divided in the substreams 2.1 and 2.2. The direction of streams is indicated by the arrows.

The pregnant liquor substream 2.1, fed to the agglomeration stage into the first agglomeration tank 1.1, is at a temperature of 70 to 100° C., typically 80 to 90° C., and represents 30 to 60% of the total liquor stream 2.

The balance of the liquor constituting the substream 2.2 is cooled in the cooling operation 3 which can be achieved by surface heat exchangers or by flash cooling units. Most of the heat of the pregnant liquor substream 2.2 taken by the surface heat exchangers or by the flash cooling units may be transferred to the spent liquor recovered from the end of precipitation suspension and/or to any other cooling fluid.

For example the cooled pregnant liquor leaving the cooling operation 3 can be fed to one of the three tanks of the series of second agglomeration tanks 1.2, 1.3 or 1.4 of the series of second agglomeration tanks the series ending with tank 1.N, or can be distributed over two or all three of the tanks 1.2, 1.3 and 1.4 of the series of second agglomeration tanks the series ending with tank 1.N.

According to one possible embodiment of the process according to the instant invention the cooled pregnant liquor can form only one stream 4.1 or 4.2 or 4.3 fed to the agglomeration tank 1.2 or 1.3 or 1.4 respectively.

In another preferred alternative the cooled pregnant liquor can be split into two substreams 4.1 and 4.2 or 4.1 and 4.3 or 4.2 and 4.3 fed to the agglomeration tanks 1.2 and 1.3 or 1.2 and 1.4 or 1.3 and 1.4 respectively.

In another preferred alternative the cooled pregnant liquor can be split in three substreams 4.1, 4.2 and 4.3 fed to the agglomeration tanks 1.2, 1.3 and 1.4.respectively.

The temperature of the individual cooled pregnant liquor substream or substreams 4.1, 4.2 and 4.3 is 50 to 80° C. or typically 60 to 70° C., and can be different for each substream in case there is more than one substream.

The amount of fine seed 12 which is added to the first agglomeration tank 1.1 is typically in such an amount as to achieve a solids content in said agglomeration tank 1.1 of 100 to 500 g/l, typically 150 to 450 g/l or preferably 300 to 400 g/l.

The number N agglomeration tanks is typically 2 to 10, preferably 2 to 6. N may represent a number of 2, 3, 4, up to 10, with the proviso that the number N is the same or higher than the number of all agglomeration tanks fed with any pregnant liquor. The capacity of the agglomeration tanks is such as to achieve a total residence time in the agglomeration stage of 3 to 12 hours.

The agglomeration suspension 6 leaving the agglomeration stage is fed to the first tank 5.1 of the growth stage or also called precipitation tank 5.1 of the growth stage, together with the coarse seed stream 15.

In an alternative embodiment the agglomeration suspension 6 leaving the agglomeration stage can be used partly or totally as substream 6.1 for reslurrying the coarse seed if said coarse seed is filtered in the optional filtration section 14, resulting in the coarse seed suspension 15. In this case the agglomeration suspension balance substream 6.2 is fed directly to the first growth tank 5.1.

The growth precipitation stage takes place in the precipitation tanks 5.1, 5.2, . . . 5.M, allowing a residence time of typically 20 to 50 hours. M represents a number of typically 2 to 50. Preferably the growth tanks are arranged in series or in two or more series in parallel and are operated continuously. However, batch precipitation tanks or a combination of batch and continuous tanks can also be used.

The amount of coarse seed 15 added to the first growth precipitation tank 5.1 is typically in such an amount as to achieve a solids content in the end of precipitation suspension 7 of 300 to 900 g/l, typically 350 to 550 g/l.

The end of precipitation suspension stream 7 is classified in the classification operation 8. This operation can be achieved by means of hydrocyclones, conventional gravity thickeners and/or any other suspension classification equipment. The purpose of the classification operation 8 is to separate:

A coarse aluminium hydroxide fraction as product hydrate suspension stream 9. This product hydrate suspension stream is then fed to the product filtration and washing operations followed by the calcination operation.

A fine aluminium hydroxide fraction as fine seed suspension stream 10 containing the maximum possible amount of the finest particles contained in the end of precipitation suspension 7. This fine seed suspension is usually filtered, and possibly washed in the fine seed filtration section 11, giving the resulting fine seed stream 12 fed to the first precipitation tank 1.1 of the agglomeration stage. The filtered and possibly washed fine seed can also be reslurried with a part of the liquor substream 2.1 in a dedicated tank not shown on the drawing and the resulting suspension fed to the first agglomeration tank 1.1. Optional is the possibility of reslurrying the fine seed stream 12 with a side stream of spent liquor 16. Spent liquor means liquor separated from the slurry at the end of precipitation after classification.

The rest of the aluminium hydroxide as coarse seed suspension stream 13 which is usually filtered in the coarse seed filtration section 14 giving the resulting coarse seed stream 15 fed to the first precipitation tank 5.1 of the growth stage. If the filtered coarse seed is reslurried with the agglomeration substream 6.1, the coarse seed stream 15 is then the suspension resulting from this operation. In the absence of a filtration operation 14, the coarse seed stream 15 is the same as the coarse seed suspension stream 13. The filtration operation 14 can be replaced by any other thickening operation. Optional is the possibility of reslurrying the coarse seed with a sidestream of cooled pregnant liquor.

Figure 2:
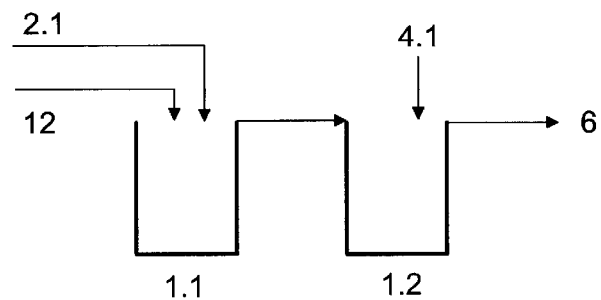

FIG. 2 provides a schematic view of the agglomeration stage of the precipitation process in the one first agglomeration tank 1.1 and the one second agglomeration tank 1.2. A controlled amount of fine aluminium hydroxide constituting the fine seed stream 12 and the pregnant liquor substream 2.1, are fed into the one first agglomeration tank 1.1. The resulting suspension is continuously transferred to the one second agglomeration tank 1.2. In tank 1.2 the balance of the liquor constituting the cooled pregnant liquor substream 4.1 is added to the suspension. The agglomeration suspension 6 leaving the agglomeration stage is fed to the first precipitation tank of the series of precipitation tank of the growth stage. The remaining process steps are for example the same as mentioned above.

Figure 3:
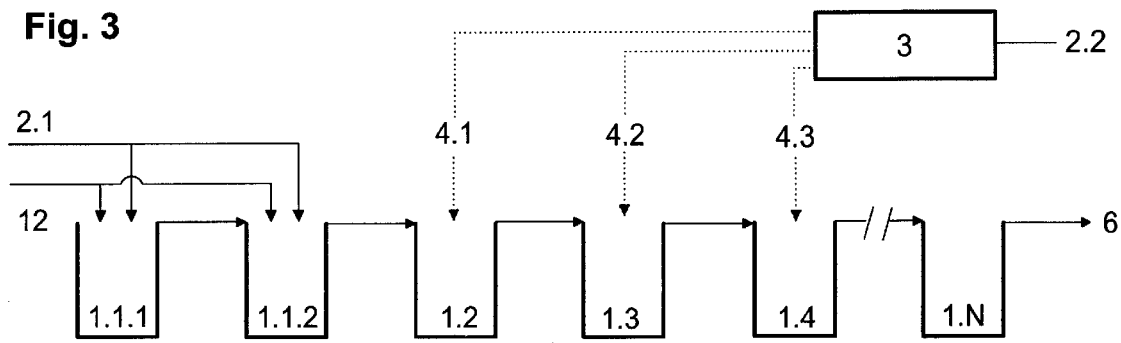

FIG. 3 provides a schematic view of the agglomeration stage of the precipitation process in a series of two first agglomeration tanks 1.1.1 and 1.1.2 and in a series of N−1 second agglomeration tanks 1.2, 1.3, 1.4 to 1.N. A controlled amount of fine aluminium hydroxide constituting the fine seed stream 12 and the pregnant liquor substream 2.1, are distributed and fed into the two first agglomeration tanks 1.1.1 and 1.1.2. The tanks 1.1.1. and 1.1.2 are connected in series and the resulting suspension is transferred to tank 1.2 of the series of second agglomeration tanks. The balance of the pregnant liquor 2.2 is cooled in the cooling operation 3 constituting the cooled pregnant liquor substreams 4.1 or 4.2 or 4.3. In tanks 1.2 or 1.3 or 1.4 the cooled pregnant liquor substream 4.1 or 4.2 or 4.3 is added to the suspension accordingly. Or, in an alternative embodiment, the pregnant liquor substream 2.2 is cooled in the cooling operation 3 and can be split in substreams 4.1 and 4.2 or 4.1 and 4.3 or 4.2 and 4,3 or 4.1, 4.2 and 4.3 and said substreams are added to the tanks 1.2 and 1.3 or 1.2 and 1.4 or 1.3 and 1.4 or 1.2 and 1.3 and 1.4 accordingly. The second agglomeration tanks 1.2 to 1.N are arranged in series and the agglomeration suspension flow is indicated by the arrows. The agglomeration suspension 6 leaving the agglomeration stage is fed to the first precipitation tank of the growth stage. The remaining process-steps are for example the same as mentioned above.

Figure 4:
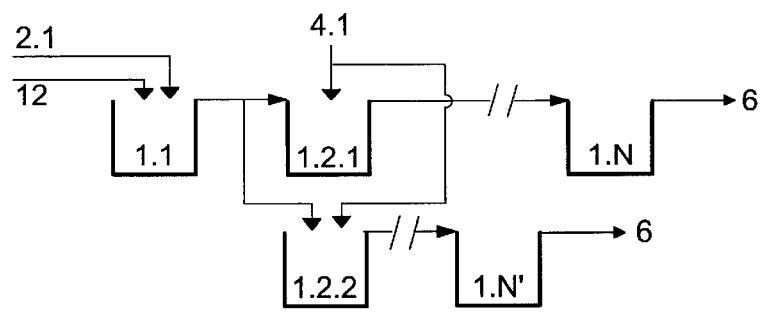

FIG. 4 provides a schematic view of the agglomeration stage of the precipitation process in the one first agglomeration tank 1.1 and in the series of second agglomeration tanks 1.2.1 and 1.2.2. The first agglomeration tank 1.1 is connected in series with the following second agglomeration tanks 1.2.1 and 1.2.2. Said second agglomeration tanks 1.2.1 and 1.2.2 are in parallel. A controlled amount of fine aluminium hydroxide constituting the fine seed stream 12 and the pregnant liquor substream 2.1, are fed into the one first agglomeration tank 1.1. The resulting suspension is transferred to the one second agglomeration tank 1.2. In tank 1.2.1 and 1.2.2 the balance of the liquor constituting the cooled pregnant liquor substream 4.1 is added to the suspension, preferably in equal amounts. The suspension leaving the tanks 1.2.1 and 1.2.2 forms either the agglomeration suspension 6 leaving the agglomeration stage or the suspension is fed to the following second agglomeration tanks in series with tanks 1.2.1 and 1.2.2. In the later case the suspension forms after tanks 1.N, 1.N' respectively, the agglomeration suspension 6 flowing to the first precipitation tank of the growth stage. The remaining process-steps are for example the same as mentioned above.

Figure 5:
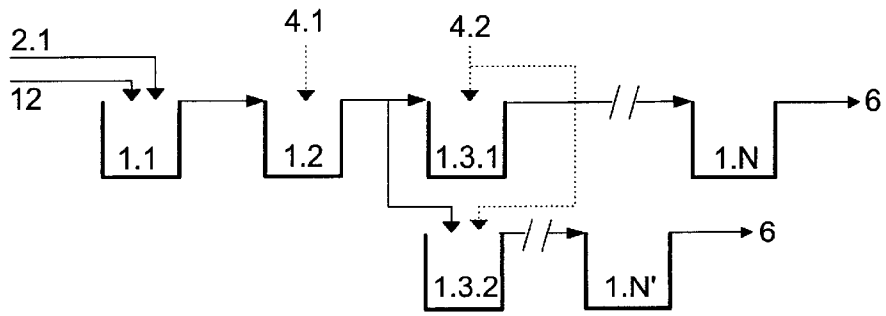

FIG. 5 provides a schematic view of the agglomeration stage of the precipitation process in the one first agglomeration tank 1.1 and the second agglomeration tanks 1.2., 1.3.1 and 1.3.2. The first agglomeration tank 1.1 is connected in series with the following second agglomeration tank 1.2 and subsequently the second agglomeration tanks 1.3.1. and 1.3.2. Said second agglomeration tanks 1.3.1 and 1.3.2 are in parallel. A controlled amount of fine aluminium hydroxide constituting the fine seed stream 12 and the pregnant liquor substream 2.1 are fed into the one first agglomeration tank 1.1. The resulting suspension is transferred to the second agglomeration tank 1.2. The cooled pregnant liquor substream is divided into the cooled pregnant liquor substreams 4.1 and 4.2. Substream 4.1 is added to the suspension in tank 1.2. Substream 4.2 is added, preferably in equal amounts, to the suspension in tanks 1.3.1 and 1.3.2. The suspension leaving the tanks 1.3.1 and 1.3.2 forms either the agglomeration suspension 6 leaving the agglomeration stage or the suspension is fed to the following second agglomeration tanks. In the later case the suspension forms after tanks 1.N, 1.N' respectively, the agglomeration suspension 6 flowing to the first precipitation tank of the growth stage. The remaining process-steps are for example the same as mentioned above.

In a preferred process the supersaturated alkaline aluminate liquor is seeded with fine aluminium hydroxide to induce precipitation and said fine seed 12 is prepared by reslurrying a side stream of the supersaturated alkaline aluminate liquor 2 or of spent liquor 16 prior to being fed to the agglomeration stage.

In another preferred process embodiment the coarse aluminium hydroxide suspension 13, emerging the classification operation 8, is filtered in the filtration operation 14, whereby a coarse seed filter cake is formed and said filter cake is fed to the first precipitation tank 5.1 of the growth stage.

In another preferred process embodiment the coarse aluminium hydroxide suspension 13, emerging the classification operation 8, is filtered in the filtration operation 14, whereby a coarse seed filter cake is formed said filter cake is reslurried in a side stream of the agglomeration suspension 6.1 or of cooled supersaturated alkaline aluminate liquor and fed to the first precipitation tank 5.1 of the growth stage.

In another preferred process the growth stage is made of precipitation tanks 5.1 to 5.M in series or precipitation tanks in parallel or a combination of precipitation tanks in series and parallel.

For the various process operations presented above with the support of the attached drawings FIGS. 1 to 5, the normal equipment allowing their implementation such as pipes, lines, tanks, washers, filters, classifiers, coolers and so on, are not described in detail because there exists a wide flexibility in the design of the installations capable of operating them.

The process described above can be equipped with additional equipment such as intermediate cooling facilities which can be inserted within the growth precipitation equipment in order to further optimize the temperature profile along precipitation.

EXAMPLES

A plant test is carried out over two precipitation lines (A) and (B) running in parallel, both lines with five agglomeration tanks in series, allowing a total residence time in the agglomeration stage of each line of 4.5 hours. The tanks of each line are numbered from tank 1 for the first tank to tank 5 for the last tank. The total duration of the test is 54 days. For comparison purposes the agglomeration stage of line (A) is run with a pregnant liquor flow splitting of 50% to tank 1, with a liquor temperature of 74 to 75° C. and 50% to tank 3 with a liquor temperature of 74 to 75° C. This temperature of 74 to 75° C. is the temperature observed along the whole agglomeration stage.

In accordance to the instant invention, the agglomeration stage of line (B) is run with a pregnant liquor flow splitting of 50% to tank 1 with a liquor temperature of 84° C. and 50% to tank 3 with a liquor temperature of 62 to 64° C. The temperature achieved in the last three tanks (tanks 3–5) is 74 to 75° C. The liquor flow and temperature profile in the growth stage are the same for both lines (A) and (B).

It must be mentioned that the two precipitation lines (A) and (B) used for the test are not totally independent as at the end of precipitation the suspensions of both lines (A) and (B) are combined. Therefore, the fine seed and coarse seed qualities are the same for both lines and the product hydrate quality is the one resulting from the operation of both lines.

The quality of the liquor during the plant test are as follows:

| Pregnant Liquor (Industrial) | |
| --- | --- |
| g/l total carbon | 15.0 |
| g/1 $Na_2O$ caustic | 135.0 to 136.0 |
| molar ratio $Na_2O/Al_2O_3$ | 1.33 to 1.35 |

The other particular test conditions and the results obtained are presented in the following table:

TABLE

Results of plant trial on liquor splitting, splitting and cooling respectively:

| | Line A Reference | Line B Inventive |
| --- | --- | --- |
| Fine seed | | |
| % $Na_2O$ occluded at test start | | 0.46 |
| % $Na_2O$ at test end | | 0.42 |
| Agglomeration suspension | | |
| g/l solids (average) | 189 | 187 |
| % $Na_2O$ occluded at test start | 0.51 | 0.49 |
| % $Na_2O$ occluded at test end | 0.48 | 0.43 |
| End of precipitation suspension | | |
| g/l solids (average) | | 425 |
| % - 44 micron fraction at test start | 5.7 | 5.9 |
| % - 44 micron fraction at test end | 6.3 | 6.0 |
| Productivity in g $Al_2O_3$/1 liquor | | |
| at test start | 78 | 78 |
| at test end | 78 | 78 |
| Product hydrate | | |
| % $Na_2O$ occluded at test start | | 0.44 |
| % $Na_2O$ occluded at test end | | 0.40 |

The term "test start" refers to the begin of the test after one day, the term "test end" refers to the end of the tests after 54 days.

It can be seen that the productivity and granulometry are not significantly affected by the inventive process.

After the 54 days of the test, the occluded soda in the product hydrate is decreased from 0.44 to 0.40% $Na_2O$. Two substreams of pregnant liquor having different temperatures are applied in line (B) only. This means that with both lines (A) and (B) operated under the temperature conditions of line (B) then an occluded soda content of 0.36% $Na_2O$ could be reached after 54 days. Since at the end of the test the decreasing occluded $Na_2O$ trend is still significant, one can conclude that a product hydrate with less than 0.35% $Na_2O$ to compare with 0.44% $Na_2O$ initially, could be reached under liquor flow splitting and temperature difference conditions. This with the proviso the same conditions as for line (B) would have been applied for line (A) and more time would have been allowed. This represents a decrease in the order of 0.1% $Na_2O$ occluded for the liquor and for the plant under consideration. In other words, a relative decrease of more than 20% concerning occluded soda can be reached.

What is claimed is:

1. A process for manufacturing coarse aluminium hydroxide by decomposition of a supersaturated alkaline aluminate liquor in a two stage precipitation process having an agglomeration stage in agglomeration tanks, connected in series, where the liquor is seeded with fine aluminium hydroxide to induce precipitation and formation of a suspension, the feed of the supersaturated alkaline aluminate liquor to the agglomeration stage is split into a first substream and said first substream is fed to a single first agglomeration tank or to the first and more of a series of first agglomeration tanks, at a higher liquor temperature of 70° to 100° C. and to a second substream and said second substream is fed to a second agglomeration tank or to a series of 2 or more second agglomeration tanks at a lower liquor temperature of 50° to 80° C., the residence time of the suspension in the agglomeration stage tanks is 3 to 12 hours, all of the supersaturated alkaline aluminate liquor being added during the agglomeration stage, followed by a growth stage, where the suspension is seeded with a coarse aluminium hydroxide, yielding at the end of precipitation a strong coarse product hydrate, giving after calcination a sandy alumina with low occluded soda content, compatible with a high liquor productivity.

2. The process according to claim 1, wherein the amount of liquor split into the first substream represents 30 to 60 percent of the total supersaturated alkaline aluminate liquor flow.

3. The process according to claim 1, wherein the first substream is fed and distributed to each of a series of 2 or more first agglomeration tanks, at a higher liquor temperature of 70° to 100° C.

4. The process according to claim 3, wherein the number of series of first agglomeration tanks is two.

5. The process according to claim 1, wherein the first substream of the supersaturated alkaline aluminate liquor is fed at a temperature of 70° to 90° C.

6. The process according to claim 5, wherein the temperature of said first substream is 80° to 90° C.

7. The process according to claim 1, wherein the fine seed is fed into the single first agglomeration tank or is fed in the first agglomeration tank of a series of two or more first agglomeration tanks or is fed and distributed over the first two agglomeration tanks of a series of two or more agglomeration tanks.

8. The process according to claim 1, wherein the amount of liquor representing 70 to 40 percent of the total supersaturated alkaline aluminate liquor forming the second substream is fed to the one second agglomeration tank or to one of the second agglomeration tanks or is fed and distributed over two or more or all tanks of the series of second agglomeration tanks.

9. The process according to claim 8, wherein the amount of liquor representing 70 to 40 percent of the total supersaturated alkaline aluminate liquor forming the second substream is fed to the one second agglomeration tank or to 1, 2, or 3 of the series of second agglomeration tanks.

10. The process according to claim 8, wherein the amount of liquor representing 70 to 40 percent of the total supersaturated alkaline aluminate liquor forming the second substream is fed to and distributed over 2 of the series of second agglomeration tanks.

11. The process according to claim 8, wherein the amount of liquor representing 70 to 40 percent of the total supersaturated alkaline aluminate liquor forming the second substream is fed to and distributed over 3 of the series of second agglomeration tanks.

12. The process according to claim 1, wherein the second substream of the supersaturated alkaline aluminate liquor is fed to the second agglomeration tank or to the series of second agglomeration tanks at a temperature of 60° to 80° C.

13. The process according to claim 12, wherein the temperature of said second substream is 60° to 70° C.

14. The process according to claim 1, wherein the temperature of the supersaturated alkaline aluminate liquor sent to the second agglomeration tank or the series of second agglomeration tanks is 5° to 50° C. below the temperature of the supersaturated alkaline aluminate liquor sent to the first agglomeration tank or the series of first agglomeration tanks.

15. The process according to claim 1, wherein the temperature of the supersaturated alkaline aluminate liquor sent to the second agglomeration tank or the second agglomeration tanks is 15° to 40° C. below the temperature of the supersaturated alkaline aluminate liquor sent to the first agglomeration tank or the series of first agglomeration tanks.

16. The process according to claim 1, wherein the temperature of the supersaturated alkaline aluminate liquor sent to the second agglomeration tank or the second agglomeration tanks is 20° to 30° C. below the temperature of the supersaturated alkaline aluminate liquor sent to the first agglomeration tank or the series of first agglomeration tanks.

17. The process according to claim 1, wherein the suspension in the one first agglomeration tank or in the series of agglomeration tanks has a solids content of 100 to 500 g/l.

18. The process according to claim 16, wherein the solids content of said suspension is 150 to 450 g/l.

19. The process according to claim 16, wherein the solids content of said suspension is 300 to 400 g/l.

20. The process according to claim 1, wherein the solids content of the suspension at the end of the growth stage is 300 to 900 g/l.

21. The process according to claim 1, wherein the solids content of the suspension at the end of the growth stage is 350 to 550 g/l.

22. The process according to claim 1, wherein the residence time for the precipitation of the suspension in the growth stage is 20 to 50 hours.

23. The process according to claim 1, wherein the liquor is seeded with fine aluminium hydroxide to induce precipitation and said fine seed is prepared by reslurrying a side stream of the supersaturated alkaline aluminate liquor or of spent liquor prior to being fed to the agglomeration stage.

24. The process according to claim 1, wherein the coarse aluminium hydroxide is formed by a classification operation of the precipitation suspension leaving at the end of the growth stage, followed by a filtration operation, whereby a coarse seed filter cake is formed and said filter cake is fed to the first precipitation tank of the growth stage.

25. The process according to claim 1, wherein the coarse aluminium hydroxide is formed by a classification operation of a precipitation suspension leaving at the end of the growth stage, followed by a filtration operation, whereby a coarse seed filter cake is formed and said coarse seed filter cake is reslurried in a side stream of the suspension leaving the agglomeration stage or of cooled supersaturated alkaline aluminate liquor and fed to the first precipitation tank of the growth stage.

26. The process according to claim 1, wherein the growth stage is made of precipitation tanks in series or precipitation tanks in parallel or a combination of precipitations tanks in series and parallel.

* * * * *